United States Patent [19]

Prange

[11] 4,418,572
[45] Dec. 6, 1983

[54] SEWER PIPE TESTER

[75] Inventor: Charles J. Prange, Cridersville, Ohio

[73] Assignee: Sewer Rodding Equipment Co., Lima, Ohio

[21] Appl. No.: 259,370

[22] Filed: May 1, 1981

[51] Int. Cl.³ ............................................. G01B 21/00
[52] U.S. Cl. ................................ 73/432 R; 33/178 F; 138/97
[58] Field of Search ..................... 73/432 R; 33/178 F; 138/97; 15/104.3 R; 134/167 C

[56] References Cited

U.S. PATENT DOCUMENTS

| | | | |
|---|---|---|---|
| 4,073,302 | 2/1978 | Jones | 15/104.3 R X |
| 4,213,246 | 7/1980 | Stevens | 33/178 F |
| 4,235,020 | 11/1980 | Davis et al. | 33/178 F |
| 4,253,497 | 3/1981 | Martin et al. | 138/97 |
| 4,265,025 | 5/1981 | Finlayson et al. | 33/178 F |

FOREIGN PATENT DOCUMENTS 1362929 8/1974 United Kingdom .................. 138/97

Primary Examiner—Herbert Goldstein
Assistant Examiner—Joseph W. Roskos
Attorney, Agent, or Firm—David O'Reilly

[57] ABSTRACT

A device for testing sewer pipes comprised of an elongated section of conduit having a nozzle on one end and a coupling on the other end for coupling hose to feed the device into a sewer pipe and fluid to the nozzle. Intermediate the ends of the elongated section of conduit are a plurality of the deformable skids adapted to maintain the elongated section of conduit coaxial with the pipe being tested. The deformable skids allow the device to easily pass through the pipe being tested and to identify any blockages, irregularities or deformities. The tool can be used to test the true integrity of any pipe.

13 Claims, 3 Drawing Figures

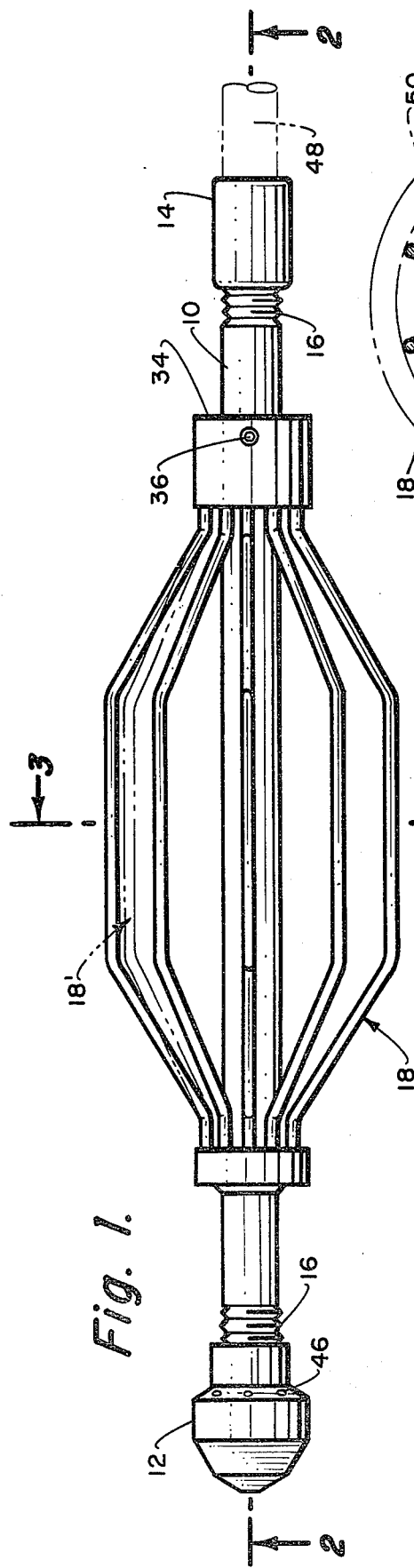
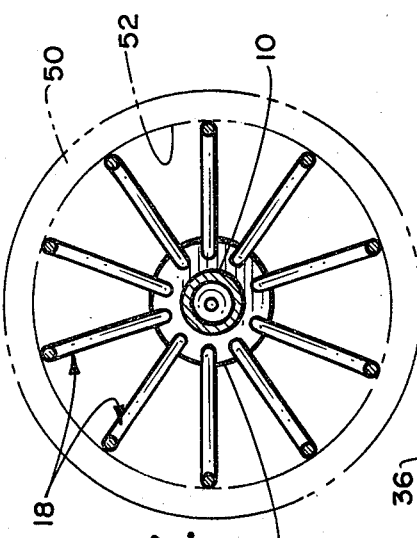
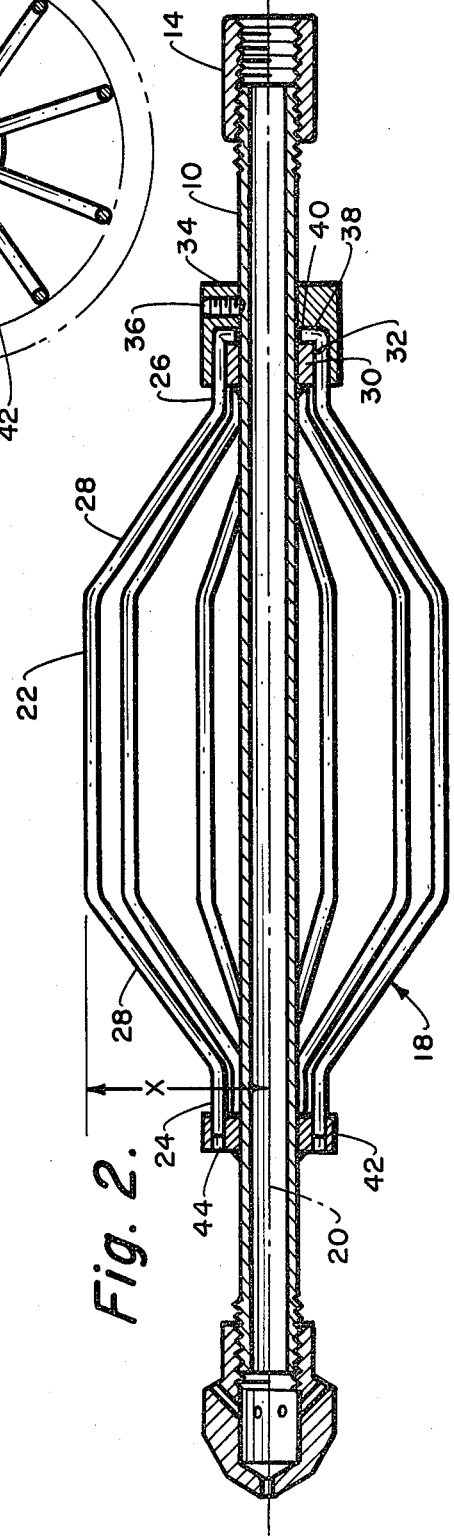

SEWER PIPE TESTER

BACKGROUND OF THE INVENTION

This invention relates to devices for testing pipes for obstructions and, more particularly, relates to devices for testing sewer pipes, known as sewer pipe proofers.

Devices for testing pipes and, in particular, sewer pipes, are usually in the form of a projectile which is passed through the pipe to determine if, and where, there is any blockage. Generally, these devices are in the form of an elongated section of conduit which is forced through a sewer pipe by sequentially adding sections, or continuous lengths of pipe, rod or hose, as the device is fed into the pipe being tested. The pipe tester usually has a plurality of rigid guides much smaller than the diameter of a pipe to keep it spaced from the side walls of the pipe being tested. A difficulty with the prior art devices is, however, its inability to accurately identify blockages, irregularities or deformities in the pipe. If a portion of the side wall of the pipe has been bent or deformed, it is difficult for these rigid guides to identify these places and/or blockages may be indicated where there actually are none.

OBJECTS AND SUMMARY OF THE INVENTION

The purpose of the present invention is to provide a sewer pipe proofing device which will easily identify blockages, irregularities or deformities in a pipe being tested.

The present invention is comprised of a section of elongated pipe threaded on each end and having a nozzle attached to one end and a coupling device attached to the other. Intermediate the ends of the section of conduit, a plurality of evenly spaced resilient deformable spacers or skids are provided attached around the periphery of the pipe which together form a cylinder of revolution approximately equal to or slightly less than the inside diameter of the pipes being tested. The spacers are in the form of flexible steel rods secured at one end to the outer surface of the section of conduit and restrained at the other end. The restrained end, however, is allowed a predetermined amount of axial deflection, while being restrained from radial displacement. This allows the steel rods forming the spacers to deflect, as an irregularity in the pipe is encountered, allowing the pipe tester to accommodate for these deformities.

The spacers or skids are secured to the section of elongated conduit by a ring having a plurality of slots into which one end of the steel rod seats and is secured by a clamping collar. The other end of the deformable rods engages a ring having a plurality of equally spaced bores which are slightly larger than the diameter of the ends of the rods. The ends of the rods slide into these bores and are free to displace in an axial direction. The rods are formed with two short sections parallel to the axis of the conduit section and a middle section of substantial length also parallel to the axis of the conduit, but spaced therefrom a distance equal to approximately one-half the inside diameter of the pipe to be tested. Intermediate the ends of the parallel sections, are two-angled sections forming with the middle section three sides of a trapezoidal shape. This allows the rod to be easily deflected by the angles at the intermediate and end sections. The number of spacers used depends upon the size of the particular sewer pipe proofing device. For pipes in the range of 6-20 inches, there will be on the order of 8-10 spacers equally spaced, around the outside surface of the conduit section.

It is one object of the present invention to provide a pipe testing device which will accurately test the integrity of any pipe.

Another object of the present invention is to provide a pipe testing device which will identify blockages, irregularities or deformities in a pipe.

Another object of the present invention is to provide a sewer pipe testing device having a plurality of deformable skids maintaining the testing device coaxial with the pipe to be tested.

Yet another object of the present invention is to provide a sewer pipe testing device having a plurality of equally spaced deformable skids secured around the periphery of a conduit section.

These and other objects, advantages and novel features of the invention will become apparent from the following detailed description of the invention when considered in conjunction with the accompanying drawings wherein like reference numbers identify like parts throughout:

BRIEF DESCRIPTION OF THE DRAWINGS

FIG. 1 is a side elevation of a sewer pipe testing device according to the invention;

FIG. 2 is a sectional view of the sewer pipe testing device taken at 2—2 of FIG. 1;

FIG. 3 is a sectional view of the sewer pipe testing device taken at 3—3 of FIG. 1.

DESCRIPTION OF THE BEST EMBODIMENTS CONTEMPLATED

As shown in FIG. 1, the sewer pipe testing device is comprised of a section of conduit 10 having a nozzle 12 at one end, and a coupling device 14 at the other. Preferably, these devices are secured by threads 16 on each end of the section of conduit 10. Intermediate the ends of the section of conduit 10 a plurality of deformable spacers or skids 18 are secured to the conduit section. The spacers 18 are in the form of steel rods which may deflect when the sewer type testing device is being fed through a sewer pipe, and a blockage or irerregularity is encountered.

The deformable spacers are constructed of a specially formulated spring steel to allow for maximum wear and flexibility and are attached to the conduit 10 with the distance from the axis 20 of the conduit section 10 to the center section 22 of each deformable spacer being equal to or less than one-half of the diameter of the pipe the tester is constructed for. The deformable spacers 18 have short end portions 24 and 26 parallel to the axis 20 with the intermediate portion 22 joined by angular portions 28 to provide the resilient deflectable action of the spacer.

The spacers are interchangeable for various pipe diameters and are secured to the conduit section 10 by means of a ring 30 attached to the conduit section 10, having a plurality of cylinderical grooves 32 into which the ends 26 of the deformable rods 18 are seated. A collar 34 is then slid over the ends 26 of the deformable rods and firmly clamped by means of an Allen screw 36. In order to assure that the rods are thoroughly clamped to the conduit 10, a slight bend 38 may be provided in the ends of the rods fitting over a shoulder 40 formed by the ring 30. Preferably, the grooves 32 in the ring 30 are equally spaced around the periphery.

The other end of the deformable spacers 18 are secured by a second ring 42 attached to the conduit section 10 having a plurality of bores 44 equal to the number of spacers. The bores 44 are slightly larger than the diameter of the ends of the rod forming the spacers 18, allowing the short, straight portion 24 to freely displace axially in the bore. The ring 42 thus allows the ends 24 to freely deflect, but restrains them from any radial movement away from the conduit section 10.

In use, the sewer pipe testing device is fed into the pipe 50 (FIG. 3) to be tested with the nozzle 12 attached. The nozzle 12 is provided with a number of ports, some which will be backward projecting as shown at 46 to aid in feeding the proofer through the pipe being tested. Continuous lengths or additional sections of conduit rods or hose, as indicated at 48, will be connected through the coupler 14 to the conduit section 10 as the proofer continues to be fed into the pipe. The proofer is forced through the sewer pipe being tested by the lengths of hose or pipe. Should there be a blockage, such as root infiltration, a deformity or minor irregularity in the pipe, it will be immediately identified. However, if the proofer becomes lodged, the skids can retract or deflect, as indicated at 18' allowing the tester to freely pass over the irregularity so that the tool can be withdrawn.

A unique feature of the present invention is that the design allows easy repair, replacement or interchangeability of one or all of the spacers if they are damaged during use, or a different diameter is needed. By simply removing the collar 34 and lifting out the spacer or spacers, they can be repaired or replaced as necessary. Also, as previously indicated, the intermediate axially parallel section 22 forms with the adjacacent intermediate axial sections and adjacent spacers, a cylinder of revolution nearly equal to the inner diameter of the pipe being tested. If desired, all the deformable spacers 18 could be removed and replaced with interchangeable spacers for different diameter pipes.

The use of the device in a sewer pipe is illustrated in FIG. 3, in which a pipe is shown at 50 with the diameter of the deformable spacers 18 being nearly equal to diameter 52 of the pipe. The number and size of the deformable spaces 18 will vary, depending upon the internal diameter of the pipe 50 being tested. The unique design allows an operator to pinpoint the location of obstruction, such as root infiltration or other form of debris. The skid construction permits the tool to penetrate the obstruction with the centrally located water jets in the nozzle. However, if the skids become lodged, they can retract, allowing the tool to be easily withdrawn. The problem has now been accurately charted for treatment with pipe cleaning equipment or repair.

Thus has been disclosed a sewer pipe testing device known as a SEWER PIPE PROOFER which will accurately identify blockages, obstructions, irregularities or deformities in a pipe being tested. These obstructions are identified by deformable spacers which may be easily removed for maintenance, repair or replacement, as desired.

Obviously, many modifications and variations of the invention are possible in light of above teaching. It is therefore to be understood that the full scope of the invention is not limited to the details disclosed herein, but only by the claims appended hereto, and may be practiced otherwise than as specifically described.

I claim:
1. A sewer pipe proofer comprising:

a section of conduit having an outer diameter substantially smaller than the inner diameter of the sewer pipe being proofed;

a fluid spraying nozzle attached to one end of said conduit;

a plurality of deformable spacers in the form of rods secured around said conduit intermediate said ends, said rods being formed to hold said conduit substantially centered and in spaced relationship to the inner wall of said sewer pipe;

means removably securing said rods to said conduit with at least one end being free to be slidably displaced in a direction parallel to the axis of said conduit when the rods are deformed;

restraining means restraining said at least one free end of said rods;

said means removably securing said rods to said conduit being removable to allow easy removal and replacement of individual rods whereby said conduit can be passed through a sewer pipe to test for blockage and easily pass over minor irregularities.

2. The sewer pipe proofer according to claim 1 wherein said plurality of spacers comprised a plurality of equally spaced rods around the outside of said conduit, said plurality of rods comprised of resilient rods having a portion forming a substantially cylindrical envelope having a diameter approximately equal to or less than about the inside diameter of a sewer pipe.

3. The sewer pipe proofer according to claim 1 wherein said removable securing means securely clamps one end of said resilient rods to the periphery of said section of conduit; and said restraining means restraining the other end of said resilient rods, said restraining means permitting axial movement of the rods but preventing radial movement of said other ends.

4. The sewer pipe proofer according to claim 3, wherein said means for removably securing said resilient rods comprise:

a ring attached to said section of conduit;

a plurality of substantially semi-cylindrical grooves in said ring spaced around said conduit section, one end of each of said resilient rods being seated in each groove; and a collar secured over said ring securely clamping said one end of said resilient rods.

5. The sewer pipe proofer according to claim 4 wherein said restraining means comprises:

a ring secured to said section of conduit;

a plurality of spaced cylindrical bores in said ring;

said resilient rods having their other end slidingly inserted in said bores;

said bores being larger in diameter than the rod ends whereby they may slide freely in an axial direction but are restrained from radial movement.

6. The sewer pipe proofer according to claim 5 wherein said collar is removably secured to said section of conduit whereby rods may be individually removed and replaced.

7. The sewer pipe proofer according to claim 4 wherein said ring having said grooves form a shoulder, the end of said resilient rods seated in said grooves being bent over against said shoulder.

8. The sewer pipe proofer according to claim 7 wherein said collar has an annular surface abutting against the bent over ends of said resilient rods securely clamping said rods to said conduit section.

9. The sewer pipe proofer according to claim 4 wherein said collar is removably secured to said section of conduit whereby rods may be individually removed and replaced.

10. The sewer pipe proofer according to claim 3 wherein said restraining means comprises:
   a ring secured to said section of pipe;
   a plurality of spaced cylindrical bores in said ring;
   said resilient rods having their other end slidingly inserted in said bores;
   said bores being larger in diameter than the rod ends whereby they may slide freely in an axial direction but are restrained from radial movement.

11. The sewer pipe proofer according to claim 2 wherein said resilient rods have relatively short ends and a center section substantially parallel to the axis of said conduit section; and angled portions joining said center portion to said end portions forming with said center portion a substantially trapezoidal shape; said angled portions adapted to position the center portion a distance from the axis of said conduit section equal to approximately one-half the inside diameter of a sewer pipe.

12. The sewer pipe proofer according to claim 1 wherein
   each end of said conduit section are threaded;
   coupling means threaded on one end of said conduit so that additional conduit secitons can be attached;
   said nozzle being threaded on the other end of said conduit whereby the nozzle may be easily removed for maintenance or replacement.

13. The sewer pipe proofer according to claim 12 wherein said nozzle has a pluality of backward facing spray ports whereby a fluid spray may assist in feeding the proofer through a sewer pipe.

* * * * *